(12) United States Patent
Kimura

(10) Patent No.: US 11,153,486 B2
(45) Date of Patent: Oct. 19, 2021

(54) IMAGING APPARATUS AND CAMERA SYSTEM

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/244,179

(22) Filed: Jan. 10, 2019

(65) Prior Publication Data

US 2019/0215454 A1 Jul. 11, 2019

(30) Foreign Application Priority Data

Jan. 11, 2018 (JP) .............................. JP2018-002782

(51) Int. Cl.
*H04N 5/232* (2006.01)
*H04N 5/225* (2006.01)

(52) U.S. Cl.
CPC ....... *H04N 5/23254* (2013.01); *H04N 5/2253* (2013.01); *H04N 5/2254* (2013.01)

(58) Field of Classification Search
CPC . H04N 5/23254; H04N 5/2253; H04N 5/2254
See application file for complete search history.

(56) References Cited

U.S. PATENT DOCUMENTS

2017/0289476 A1* 10/2017 Kokubu ................... G03B 9/08
2019/0141246 A1 5/2019 Sugita et al.

FOREIGN PATENT DOCUMENTS

JP 2009-251491 A 10/2009
JP 2010-117591 A 5/2010

* cited by examiner

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

An imaging apparatus includes an image sensor configured to capture an object image formed through an imaging optical system, an image stabilization unit configured to move the image sensor on a plane orthogonal to an optical axis in the imaging optical system, and a controller configured to control a movement by the image stabilization unit, and to determine a moving center in the image plane image stabilization unit based on information on the imaging optical system in an electronic preview mode used to observe an image signal about the object image based on an output from the image sensor.

22 Claims, 5 Drawing Sheets

FIG. 4A A PRIOR ART

IMAGING APPARATUS AND CAMERA SYSTEM

BACKGROUND OF THE INVENTION

Field of the Invention

The present invention relates generally to an imaging apparatus having an image stabilization unit configured to move the image plane so as to correct a blur in imaging, and more particularly to an imaging apparatus and a camera system which can provide live-view imaging.

Description of the Related Art

One recently proposed imaging apparatus includes an image stabilization unit configured to parallel move an image sensor. One proposed image stabilization unit has a large motion range for a higher image stabilization performance. Since the imaging optical system has a limited range (image circle) for projecting the object image, an excessive movement of the image stabilization unit shields a light flux from the imaging optical system and reduces a light amount. In addition, when an optical viewfinder and the image stabilization unit for translating the image sensor are combined with each other and the optical axis in the optical viewfinder and the center of the image sensor shift from each other, the composition shifts.

Japanese Patent Laid-Open No. ("JP") 2009-251491 discloses an imaging apparatus that operates only a lens image stabilization unit in an imaging preliminary operation and only an image plane image stabilization unit (image sensor. image stabilization unit) in an exposure operation in order to obtain the image stabilization effect without causing the composition to shift. JP 2010-117591 discloses an imaging apparatus that changes a moving center (a center of a movable range) in the image sensor image stabilization unit based on an instruction from a user in special imaging such as tilt-shift imaging.

The imaging apparatus disclosed in JP 2009-251491 addresses only the optical viewfinder imaging, and thus may shield part of a light flux from the imaging optical system in a live-view mode, causing a peripheral light amount to drop.

The imaging apparatus disclosed in JP 2010-117591 cannot set the moving center according to the intention of the user in non-special imaging and the maximized image stabilization function. In addition, since this reference does not consider the relationship with the optical viewfinder, a composition shift may occur.

SUMMARY OF THE INVENTION

The present invention provides an imaging apparatus and a camera system which can suppress a peripheral light amount drop and a blur in an optical system while suppressing a composition shift.

An imaging apparatus according to one aspect of the present invention includes an image sensor configured to capture an object image formed through an imaging optical system, an image sensor image stabilization unit configured to move the image sensor on a plane orthogonal to an optical axis in the imaging optical system, and a controller configured to control a movement by the image sensor. image stabilization unit, and to determine a moving center in the image sensor image stabilization unit based on information on the imaging optical system in an electronic preview mode used to observe an image signal about the object image based on an output from the image sensor.

Further features of the present invention will become apparent from the following description of exemplary embodiments with reference to the attached drawings.

BRIEF DESCRIPTION OF THE DRAWINGS

FIGS. 4A to 4E explain light shielding states.

DESCRIPTION OF THE EMBODIMENTS

Figure 1A:
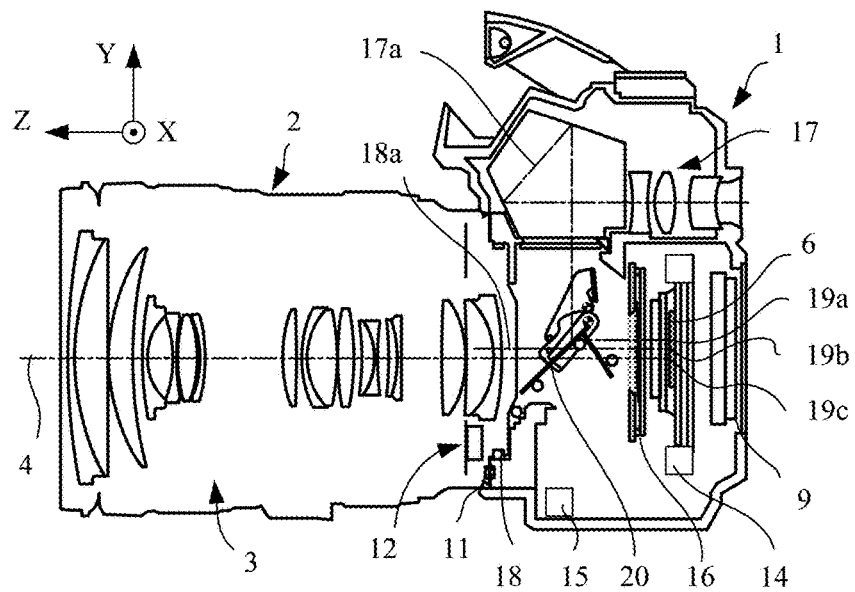
FIGS. 1A and 1B are a central sectional view of a camera system and a block diagram illustrating an electrical configuration according to an embodiment of the present invention.

Referring now to the accompanying drawings, a detailed description will be given of embodiments according to the present invention. Corresponding elements in each figure will be designated by the same reference numerals, and a duplicate description thereof will be omitted.

Figure 1B:
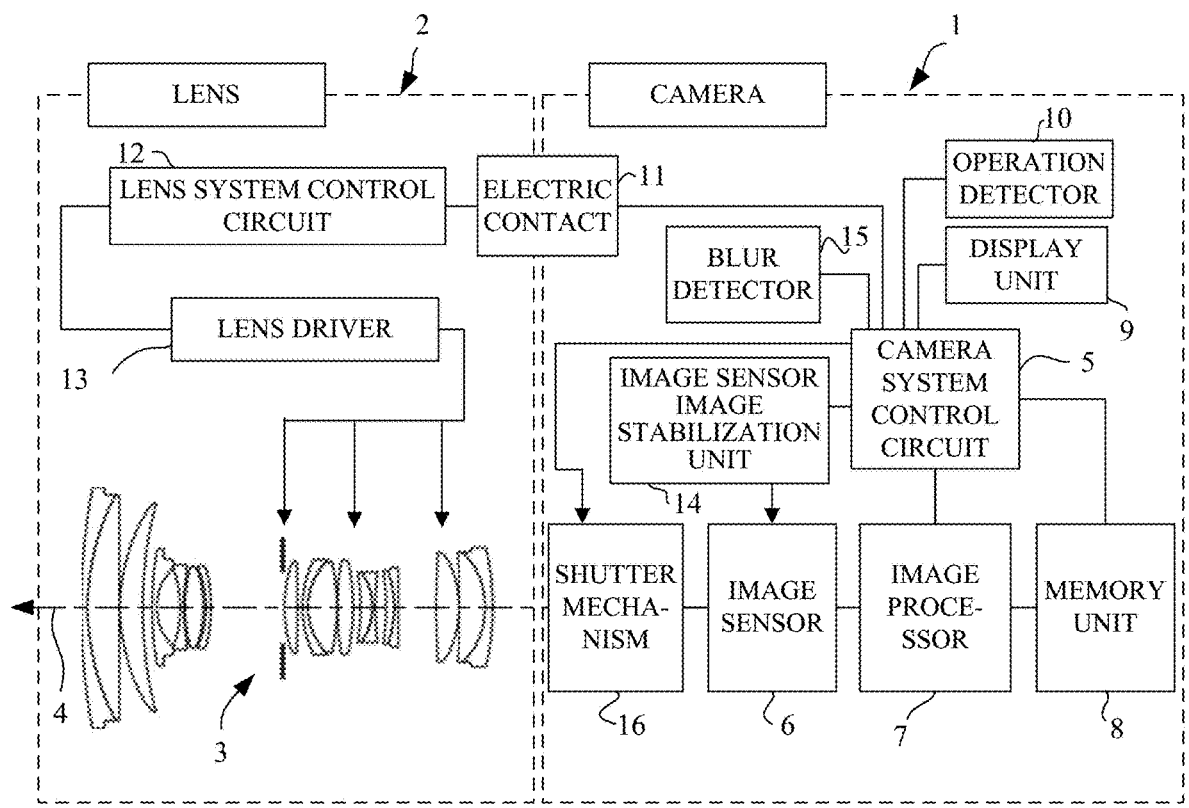

FIGS. 1A and 1B are a central sectional view of a camera system and a block diagram illustrating an electrical configuration according to an embodiment of the present invention, respectively. This embodiment sets a coordinate system as illustrated in FIG. 1A for explanatory convenience.

The camera system includes an imaging apparatus 1 and a lens unit (lens apparatus) 2. The lens unit 2 is detachably attached to the imaging apparatus 1 via a mount (mechanical contact) 18. The imaging apparatus 1 and the lens unit 2 communicate with each other via the electric contacts 11.

The camera system includes an imaging unit, an image processing unit, a recorder/reproducer, and a controller. The imaging unit includes an imaging optical system 3, an image sensor 6, and a shutter unit 16. The image processor has an image processor 7. The recorder/reproducer has a memory unit 8 and a rear display unit 9. The controller includes a camera system control circuit (controller) 5, an operation detector 10, a lens system control circuit (storage unit) 12, a lens driver 13, an image sensor image stabilization unit 14, and a blur detector 15.

The imaging unit is an optical processing system for imaging object light on the imaging surface on the image sensor 6 via the imaging optical system 3. While a mirror in a quick-return mirror unit 20 is retreated, the shutter unit 16 controls an object light amount by driving the shutter curtain.

This embodiment can select two modes according to the operation of the quick-return mirror unit 20 in the imaging preliminary operation. The first mode is an optical preview mode that enables an object image to be optically observed with a viewfinder optical system (optical viewfinder unit) 17. The second mode is an electronic preview mode that enables an object image to be electrically observed by displaying on the rear display unit 9 an image signal about the object image based on the output from the image sensor 6. In the optical preview mode, a proper exposure amount and a focus evaluation amount are obtained from an unillustrated AE sensor and an unillustrated AF sensor. In the electronic preview mode, a proper exposure amount and a focus evaluation amount are obtained from the image sensor 6. The imaging optical system 3 is properly adjusted based on the acquired exposure amount and focus evaluation value. This configuration can expose the image sensor 6 to the light flux from the imaging optical system 3 having a proper light amount, and form the object image near the image sensor 6.

The quick-return mirror unit 20 operates in switching between the optical preview mode and the electronic preview mode. FIG. 1A illustrates a state of the optical preview mode in which the light flux from the imaging optical system 3 is reflected by the quick-return mirror unit 20 and guided to the viewfinder optical system 17. The electronic preview mode retreats the mirror in the quick-return mirror unit 20, and operates the shutter unit 16 to guide the light flux from the imaging optical system 3 to the image sensor 6.

The image processor 7 includes an A/D converter, a white balance adjustment circuit, a gamma correction circuit, an interpolation operation circuit, and the like, and generates an image for recording use. The generated image is stored in the memory unit 8. The image processor 7 has a color interpolation processor, and performs color interpolation (demosaicing) processing based on a signal of Bayer array to generate a color image. The image processor 7 compresses still images, motion images, sounds, and the like using a predetermined method.

The camera system control circuit 5 generates and outputs a timing signal for imaging and the like. The camera system control circuit 5 controls the imaging unit, the image processor, and the recorder/reproducer in accordance with an external operation. For example, when the operation detector 10 detects a press of an unillustrated shutter release button, the camera system control circuit 5 controls the image sensor 6 and the image processor 7. The camera system control circuit 5 controls the display operation on the rear display unit 9. In this embodiment, the rear display unit 9 is a touch panel and is connected to the operation detector 10. The camera system control circuit 5 issues a command to the lens system control circuit 12 via the electrical contact 11, and the lens system control circuit 12 properly controls the lens driver 13. The lens driver 13 can drive a focus lens, an image stabilization lens, a diaphragm (or aperture), and the like.

The image sensor image stabilization unit 14 moves the image sensor 6 on a plane orthogonal to the optical axis 4 in the imaging optical system 3. Moving the image sensor 6 on the plane orthogonal to the optical axis 4 means moving it in at least one of the x-axis direction and the y-axis direction, where the optical axis direction is set to the z-axis. The movement may contain a movement in the z-axis direction. The image sensor image stabilization unit 14 can rotate the image sensor 6 around the optical axis 4 in the imaging optical system 3. The blur detector 15 can detect a rotational blur of the apparatus including a rotation around the optical axis. This embodiment uses a vibration gyro as the blur detector 15, but the present invention is not limited to this embodiment.

The camera system control circuit 5 can capture still and motion images by controlling the operation of each part in the imaging apparatus 1 in accordance with the operation on the operation detector 10. In the image stabilization mode, first, the camera system control circuit 5 determines, based on the signal acquired from the blur detector 15, a blur correction amount of each of the image stabilization units in the image sensor 1 and the lens unit 2 (image sensor image stabilization unit 14 and lens image stabilization unit). Next, the camera system control circuit 5 informs the lens system control circuit 12 via the electric contact 11 of the blur correction amount to be performed by the lens image stabilization unit in the lens unit 2. The lens system control circuit 12 properly controls the lens image stabilization unit via the lens driver 13. The camera system control circuit 5 operates the image sensor image stabilization unit 14 based on the blur correction amount to be performed by the image sensor image stabilization unit 14.

As described above, the lens unit 2 is detachably attached to the imaging apparatus 1 via the mount 18. A center axis 18*a* in the mount 18 and the optical axis 4 in the imaging optical system 3 do not always accord with each other. The lens system control circuit 12 includes an unillustrated nonvolatile memory and stores a shift amount between the center axis 18*a* in the mount 18 and the optical axis 4 in the imaging optical system 3 previously measured by a proper tool before the shipment from the factory etc. The lens system control circuit 12 also stores information on the size of the image circle corresponding to the lens state, which is a designed value or a factory measured value of the lens unit 2.

The center axis 18 in the mount 18 and the optical axis 17*a* in the viewfinder optical system 17 do not necessarily accord with each other. The camera system control circuit 5 includes an unillustrated nonvolatile memory and stores a shift amount between the center axis 18*a* in the mount 18 and the optical axis 17*a* in the viewfinder optical system 17 previously measured with a proper tool before the shipment from the factory. This embodiment assumes that the center axis 18*a* in the mount 18 and the optical axis 17*a* in the viewfinder optical system 17 shift from each other, and processes the shift between them. However, the shift is adjusted between the center axis 18*a* in the mount 18 and the optical axis 17*a* in the viewfinder optical system 17 in the factory shipment and an accordance may be assumed between the center axis 18*a* in the mount 18 and the optical axis 17*a* in the viewfinder optical system 17.

Figure 2:
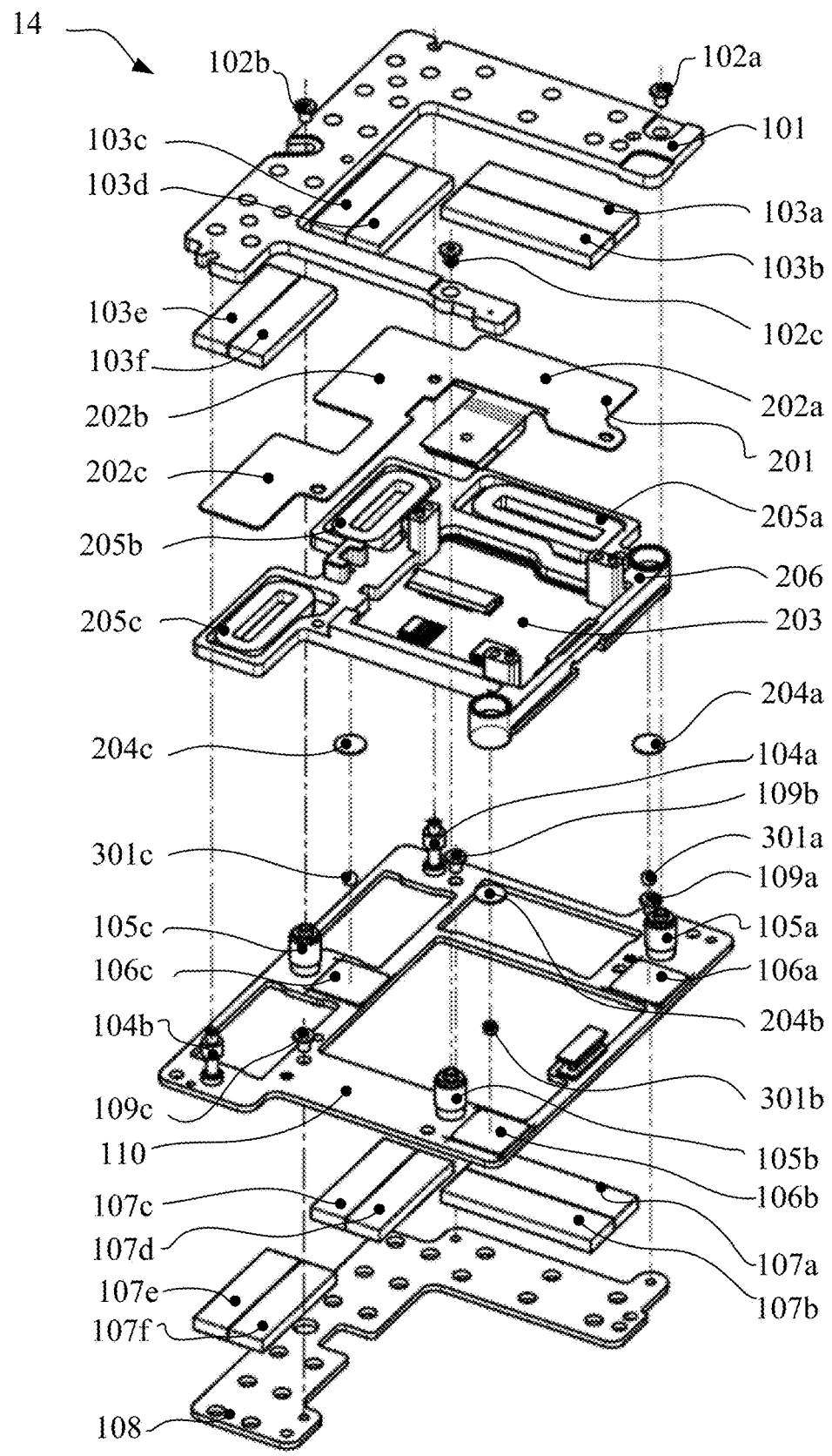
FIG. 2 is an exploded perspective view of an image sensor image stabilization unit.

FIG. 2 is an exploded perspective view of the image sensor image stabilization unit 14. For simplicity purposes, an electrical system for controlling is not illustrated. A vertical line in the figure is parallel to the optical axis 4 in the imaging optical system 3. Elements designated by 100-range are non-moving or fixed members, and elements designated by 200-range are moving or movable members. Elements designated by 300-range are balls held between a fixed member and a movable member.

An upper yoke 101, upper magnets 103*a*, 103*b*, 103*c*, 103*d*, 103*e*, and 103*f*, lower magnets 107*a*, 107*b*, 107*c*, 107*d*, 107*e*, and 107*f*, and a lower yoke 108 form a closed magnetic circuit. The upper magnets 103*a*, 103*b*, 103*c*, 103*d*, 103*e*, and 103*f* are adhered, fixed, and attracted to the upper yoke 101. The lower magnets 107*a*, 107*b*, 107*c*, 107*d*, 107*e*, and 107*f* are adhered, fixed, and attracted to the lower yoke 108. The upper magnets 103*a*, 103*b*, 103*c*, 103*d*, 103*e*, and 103*f* and the lower magnets 107*a*, 107*b*, 107*c*, 107*d*, 107*e*, and 107*f* are magnetized along the optical axis direction (vertical direction in the figure). Adjacent magnets (such as the upper magnets 103*a* and 103*b*) are magnetized in different directions. The opposing magnets (such as the upper magnet 103*a* and the lower magnet 107*a*) are magnetized in the same direction. Thereby, a strong magnetic flux density is generated between the upper yoke 101 and the lower yoke 108 along the optical axis direction.

Since a strong attractive force is generated between the upper yoke 101 and the lower yoke 108, main spacers 105*a*, 105*b*, and 105*c* and auxiliary spacers 104*a* and 104*b* are arranged so that the upper yoke 101 and the lower yoke 108 are properly spaced. The proper interval is an interval that can maintain an appropriate gap after coils 205*a*, 205*b*, and 205*c* and an FPC 201 are arranged between the upper magnet and the lower magnet. The main spacers 105*a*, 105*b*, and 105*c* have screw holes, and the upper yoke 101 is fixed onto the main spacers 105*a*, 105*b*, and 105*c* by screws 102*a*, 102*b*, and 102*c*. Rubber forming a mechanical end portion for the movable member or so-called stopper is installed on the body portion of each of the main spacers 105*a*, 105*b*, and 105*c*.

The lower yoke 108 is fixed onto a base plate 110 by screws 109*a*, 109*b*, and 109*c*. The base plate 110 has holes so as to avoid the lower magnets 107*a*, 107*b*, 107*c*, 107*d*, 107*e*, and 107*f*. The lower magnets 107*a*, 107*b*, 107*c*, 107*d*, 107*e*, and 107*f* protrude from the holes provided in the base plate 110 because its dimension in the thickness direction is larger than that of the base plate 110.

A movable frame 206 is made of magnesium or aluminum die casting, and is lightweight and highly rigid. Each element of the movable part is fixed onto the movable frame 206. Position detecting elements are attached to the FPC 201 at positions 202*a*, 202*b*, and 202*c*. This embodiment uses a Hall element as an illustrative position detecting element so that the position can be detected using the magnetic circuit described above. Since the Hall element is small, it is nested inside the windings of the coils 205*a*, 205*b*, and 205*c*.

The image sensor 6, the coils 205*a*, 205*b*, and 205*c* and the Hall element are connected to a movable PCB 203. These elements electrically exchange data with the outside via connectors on the movable PCB 203.

Fixed-portion rolling plates 106*a*, 106*b*, and 106*c* are adhered and fixed to the base plate 110. Moving-portion rolling plates 204*a*, 204*b*, and 204*c* are adhered and fixed to the movable frame 206. The fixed-portion rolling plates 106*a*, 106*b*, and 106*c* and the movable-portion rolling plates 204*a*, 204*b*, and 204*c* form rolling surfaces of the balls 301*a*, 301*b*, and 301*c*. It is easy to design the surface roughness, the hardness, and the like in a desired state by separately providing the rolling plate in this way.

A force according to the Fleming's left-hand rule is generated and the movable member can be moved by electrifying the coils 205*a*, 205*b*, and 205*c* in the above configuration. A feedback control can be performed with a signal of the Hall element. A proper control of the signal value of the Hall element can make the movable frame 206 translate on a plane orthogonal to the optical axis 4 in the imaging optical system 3. While the signal of the Hall elements at the position 202*a* is kept constant, a rotational motion around the optical axis 4 in the imaging optical system 3 can be generated by driving the signals of the Hall elements at the positions 202*b* and 202*c* with opposite phases. Hence, the movable frame 206 can be rotated around the optical axis 4 in the imaging optical system 3.

The magnetic flux density in the optical axis direction is detected at positions 202*a*, 202*b*, and 202*c*. The magnetic circuit including the upper magnets 103*a*, 103*b*, 103*c*, 103*d*, 103*e*, and 103*f*, the lower magnets 107*a*, 107*b*, 107*c*, 107*d*, 107*e*, and 107*f*, etc. has a generally nonlinear characteristic. Therefore, the magnetic flux density detected at the positions 202*a*, 202*b*, and 202*c* does not necessarily have a constant resolution in all driving ranges (or the detection resolution changes). More specifically, the magnetic flux density has steep and gentle changes, and a steeper position can provide a higher detection resolution (or a larger magnetic flux density change relative to the moving amount). The above magnetic circuit has the largest magnetic flux density change and the highest detection resolution at the boundary position between the magnets (such as a boundary position between the upper magnets 103*a* and 103*b*).

Figure 3:
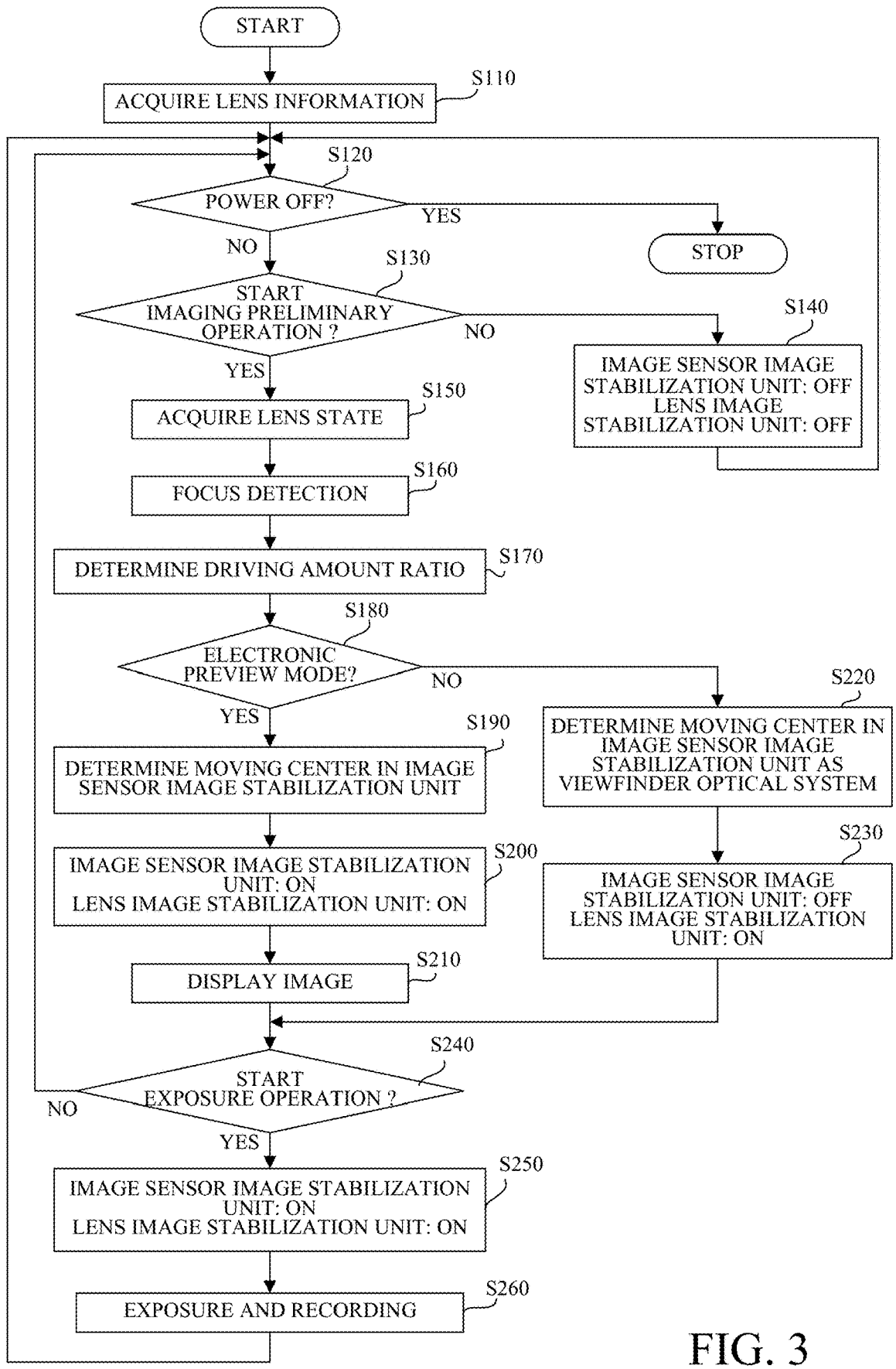
FIG. 3 is a flowchart illustrating an operation of an imaging apparatus.

Referring now to FIG. 3, a description will be given of the operation of the imaging apparatus 1. FIG. 3 is a flowchart illustrating the operation of the imaging apparatus 1. The operation of the imaging apparatus 1 starts when the imaging apparatus 1 is powered on.

In the step S110, the camera system control circuit 5 acquires lens information (information on the imaging optical system 3) from the lens system control circuit 12. In this embodiment, the lens information includes at least one of positional information on the optical axis 4 in the imaging optical system 3 and information on the size of the image circle of the imaging optical system 3.

In the step S120, the camera system control circuit 5 determines whether the power off is detected by the operation detector 10. If it is determined that the power off has been detected, the operation is terminated. If it is determined that the power off has not been detected, flow proceeds to the step S130.

In the step S130, the camera system control circuit 5 determines whether an instruction to start the imaging preliminary motion (in general, half-pressing of the release button) has been detected by the operation detector 10. If it is determined that the instruction has been detected, the flow proceeds to the step S140. If it is determined that the instruction has not been detected, the flow proceeds to the step S150.

In the step S140, the camera system control circuit 5 performs a control so as not to operate the lens image stabilization unit or the image sensor image stabilization unit 14.

In the step S150, the camera system control circuit 5 acquires a lens state which is information on the state of the imaging optical system 3 such as a focus, a zoom, and the like.

In the step S160, when the optical preview mode is set, the camera system control circuit 5 causes the AE sensor and the AF sensor to perform the light metering and focus detection, and obtains a proper exposure amount and a focus evaluation amount. When the electronic preview mode is set, the camera system control circuit 5 causes the image sensor 6 to perform the light metering and focus detection, and obtains a proper exposure amount and a focus evaluation amount. The camera system control circuit 5 drives the focus lens so that the main object image is formed on the image sensor 6 based on the information, and determines the exposure condition. The exposure condition includes at least one of the ISO speed, the F-number, and the exposure time. In driving the focus lens, the camera system control circuit 5 informs the lens system control circuit 12 of an amount to drive the focus lens via the electrical contact 11. The lens system control circuit 12 properly drives the focus lens via the lens driver 13.

In the step S170, the camera system control circuit 5 determines a driving amount ratio used to correct the image sensor image stabilization unit 14 and the lens image stabilization unit, using the lens state acquired in the step S150. Since a blur amount on the image sensor increases as the focal length increases, the ratio of the lens image stabilization unit is increased in the lens state having a relatively long focal length and the ratio of the image sensor image stabilization unit 14 is increased in the lens state having a short focal length.

In the step S180, the camera system control circuit 5 determines whether the imaging apparatus 1 is set to the electronic preview mode. If it is determined that the electronic preview mode is set, the flow proceeds to the step S190. If it is determined that the electronic preview mode is not set, the flow proceeds to the step S220.

In the step S190, the camera system control circuit 5 determines the moving center of the image sensor image stabilization unit 14 based on the lens information acquired in the step S110. The camera system control circuit 5 may determine the moving center in the image sensor image stabilization unit 14 so that the moving center in the image sensor image stabilization unit 14 accords with the optical axis 4 in the imaging optical system 3. Thereby, an image with an alleviated peripheral light amount drop can be acquired. When the image circle has the size margin or when the peripheral light amount drop is negligible, the camera system control circuit 5 may determine the moving center in the image sensor image stabilization unit 14 independently of the optical axis 4 in the imaging optical system 3. For example, the moving center in the image sensor image stabilization unit 14 may be set to a position that maximizes the image stabilization function or a position that minimizes the electric power for the image stabilization unit. The position that maximizes the image stabilization function is, for example, a stroke center of the image stabilization unit, a position with a good controllability (or a position with a good detection resolution of the position detecting element), a position that reduces the driving friction, or the like. The camera system control circuit 5 may determine the moving center in the image sensor image stabilization unit 14 so that it is located on a straight line that connects the optical axis 4 in the imaging optical system 3 and a position that maximizes the image stabilization function with each other. Thereby, the image stabilization function can be maximized within a range that can ignore the peripheral light amount drop.

In the step S200, the camera system control circuit 5 operates the image sensor image stabilization unit 14 and the lens image stabilization unit. The camera system control circuit 5 determines a blur correction amount for each image stabilization unit based on a driving amount ratio determined in the step S170 and the signal acquired from the blur detector 15, and operates each image stabilization unit based on the determined amount. This configuration can reduce the image degradation caused by the so-called blurring. In addition, since the moving center in the image sensor image stabilization unit 14 is properly determined in the step S190, an image in which the peripheral light amount drop around the imaging optical system 3 and blurs are suppressed can be acquired.

In the step S210, the camera system control circuit 5 acquires an image to be displayed in the electronic preview mode from the image sensor 6 and displays it on the rear display unit 9. Thereby, the image is updated and the object image is electronically observable.

In the step S220, the camera system control circuit 5 determines the moving center in the image sensor image stabilization unit 14 so that the moving center in the image sensor image stabilization unit 14 accords with the optical axis 17a in the viewfinder optical system 17. This step sets the optical preview mode, and the photographer optically observes the object image via the viewfinder optical system 17. If the optical axis 17a in the viewfinder optical system 17 and the center of the image sensor 6 do not accord with each other, the composition shifts between the observed image and the captured image. The composition shift means that the image viewed when the composition is determined and the recorded image shift from each other. Since the image acquired from the image sensor 6 is displayed in the electronic preview mode, no composition shifts in principle. If the composition shifts, an image may be different from the intention of the photographer. Although the composition cannot be changed later in the image captured with the shifted composition, a peripheral light amount may be electronically corrected. Therefore, the composition shift is suppressed at the expense of the peripheral light amount in the optical preview mode.

In the step S230, the camera system control circuit 5 operates the lens image stabilization unit without operating the image sensor image stabilization unit 14. Since the light flux from the imaging optical system 3 is reflected by the quick-return mirror unit 20 in the optical preview mode, the observed image does not change even when the image sensor image stabilization unit 14 in the subsequent stage is operated. Hence, this step keeps stationary the image sensor image stabilization unit 14 so that the moving center accords with the optical axis 17a in the viewfinder optical system 17. A properly stabilized image is observed since the lens image stabilization unit operates although the stroke is small because the image sensor image stabilization unit 14 is not operating.

In the step S240, the camera system control circuit 5 determines whether the operation detector 10 has detected the instruction to start the exposure operation (generally, full pressing of the release button). If it is determined that the instruction has been detected, the flow proceeds to the step S250. If it is determined that the instruction has not been detected, the flow returns to the step S120.

In the step S250, the camera system control circuit 5 operates the image sensor image stabilization unit 14 and the lens image stabilization unit. The camera system control circuit 5 determines a blur correction amount for each image stabilization unit based on the driving amount ratio determined in the step S170 and the signal acquired from the blur detector 15 and operates each image stabilization unit based on the determined amount. This configuration can reduce the image degradation caused by the so-called blurring.

In the step S260, the camera system control circuit 5 causes the imaging apparatus 1 to perform the exposure, and to store the obtained object image in the memory unit 8.

As described above, this embodiment sets the moving center in the image sensor image stabilization unit 14 to a composition priority position (the optical axis 17a in the viewfinder optical system 17) in the optical preview mode, and to the moving center in the imaging optical system 3 in the optical axis 4 or the position based on the image stabilization performance in the electronic preview mode. Thereby, the object image can be acquired without any composition shifts. The signal from the image sensor 6 is converted into an electrical signal and then made observable in the electronic preview mode. Since the signal from the image sensor 6 is used (or there is no room for decentering because the same route is used between the preview and the exposure for recording), no composition shifts in principle. In addition, the light flux can be surely guided to the peripheral portion without the development or so-called crop imaging using part of the signal from the image sensor 6.

Referring now to FIGS. 4A to 4E, a description will be given of the effect and the operation state of the present invention. FIGS. 4A to 4E explain the light shielding states when the image sensor 6 is viewed from the positive direction of the Z axis. As illustrated, the image sensor 6 has a rectangular effective pixel area (an area for generating an output image). At positions 19a, 19b, and 19c, the optical axis 17a in the viewfinder optical system 17, the center axis 18a in the mount 18, and the optical axis 4 in the imaging optical system 3 intersect with the plane on which the image sensor 6 is disposed. This embodiment shifts the positions 19a, 19b, and 19c only in the Y direction for simplicity purposes, but in practice they are relatively shifted on the XY plane. A center line 31 is the Y axis passing through the positions 19a, 19b, and 19c. Center lines 32a, 32b, and 32c are parallel to the X axis and pass through the positions 19a, 19b, and 19c, respectively. A region 33 is an area which a light amount from the imaging optical system 3 sufficiently reaches. A region 34 is an area in which the light amount from the imaging optical system 3 is slightly lowered. A region 35 is an area in which a light amount from imaging optical system 3 is significantly lowered. The light amount from the imaging optical system 3 actually changes continuously, but this embodiment illustrates three stepwise changes for simplicity purposes.

FIG. 4A illustrates the state in the conventional electronic preview mode. The moving center in the image sensor image stabilization unit 14 is determined only by the convenience of the image capturing apparatus 1 without using the lens information. Therefore, the moving center in the image sensor image stabilization unit 14 is generally set to a position 19b where the image sensor image stabilization unit 14 has the largest operation stroke. The position 19c decenters in the downward direction from the design nominal (with a state where there is no shift from the designed value), and the image circle has no size margin. In the design nominal state, the positions 19a, 19b, and 19c accord with one another. Herein, "the image circle has no size margin" means that there is substantially no difference between the size of the effective pixel area in the image sensor 6 and the size of the area 33. In other words, it means that the effective pixel area in the image sensor 6 extends to at least part the area 34 due to a slight error (decentering). The image circle has a radius of r1. As illustrated, the upper right corner and the upper left corner of the effective pixel area in the image sensor 6 are located in the area 34. Thus, the captured image partially has a conspicuous light amount drop. No composition shifts in the electronic preview mode.

Figure 4B:
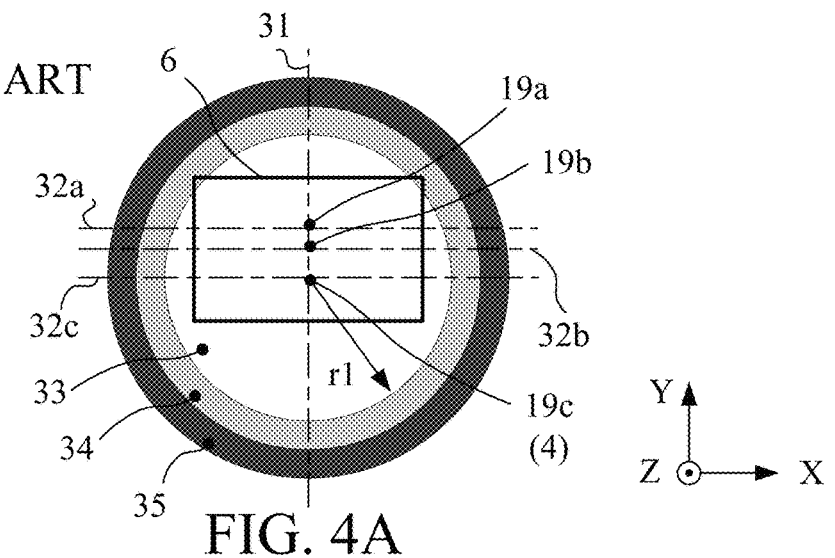
Figure 4B:
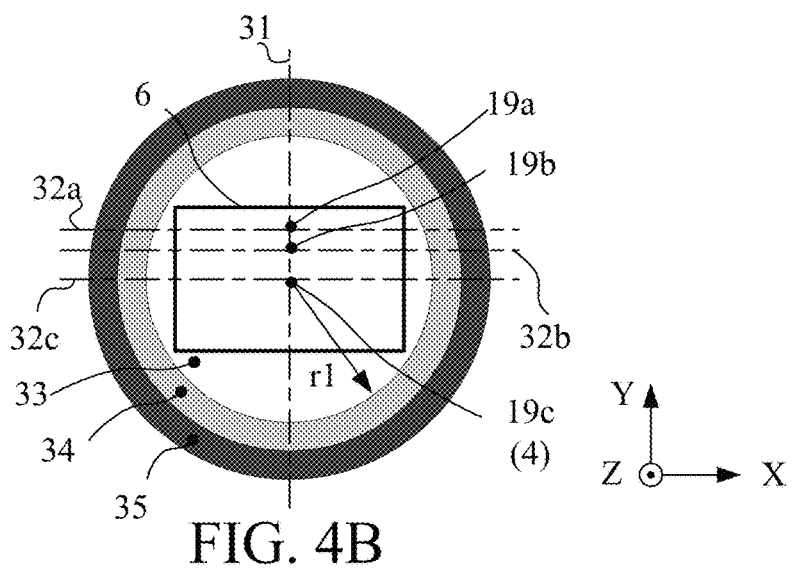

FIG. 4B illustrates the state in the electronic preview mode according to this embodiment. The position 19c is set so that the moving center in the image sensor image stabilization unit accords with the optical axis 4 in the imaging optical system 3. The position 19c shifts in the downward direction from the design nominal (located at the position 19b in FIG. 4B), and the image circle has no size margin. The image circle has a radius of r1. Unlike FIG. 4A, since the moving center in the image sensor image stabilization unit 14 is set to the position 19c, the effective pixel area in the image sensor 6 is entirely located in the area 33. In other words, the captured image has no conspicuous light amount drop. No composition shifts in the electronic preview mode.

Figure 4C:
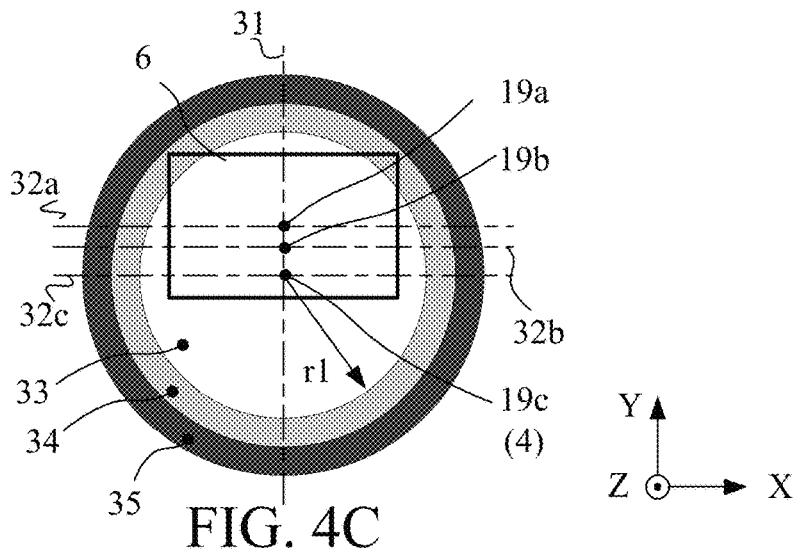

FIG. 4C illustrates the state in the optical preview mode according to this embodiment. The moving center in the image sensor image stabilization unit 14 is set to the position 19a. The position 19c decenters in the downward direction from the design nominal (located at the position 19b in FIG. 4C), and the image circle has no size margin. The image circle has a radius of r1. Then, a light amount drop is larger than that in FIG. 4A. Nevertheless, the photographer determines the composition while viewing the viewfinder, and thus the suppressed composition shift is more emphasized than the suppressed light amount drop and the composition shift is suppressed at the expense of the peripheral light amount drop.

Figure 4D:
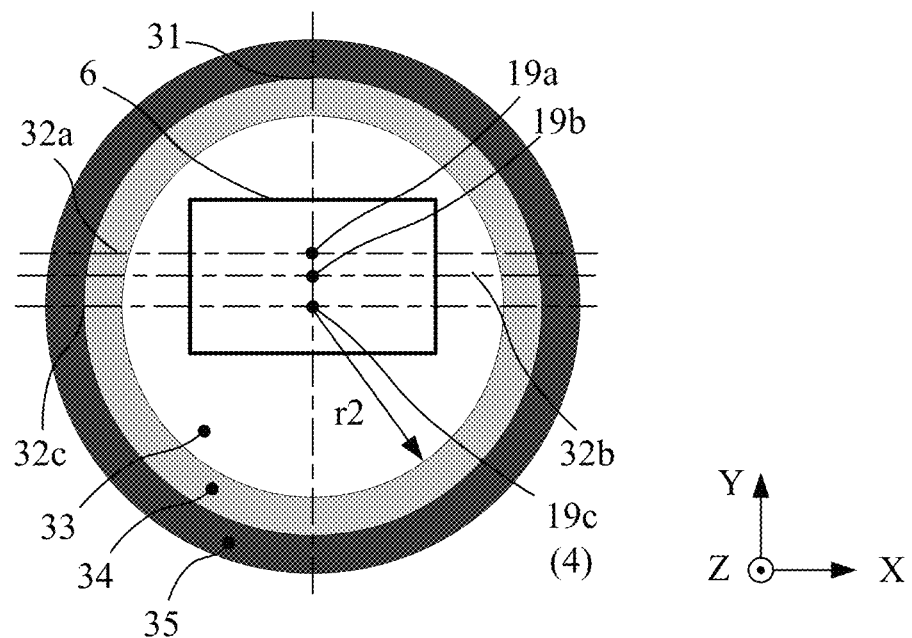

FIG. 4D illustrates the image circle having a size margin in the electronic preview mode. While the position 19c decenters in the downward direction from the design nominal (located at the position 19b in FIG. 4D), the image circle has a size margin. The image circle has a radius of r2 ($>$r1). Since the image circle has a size margin, the light amount is unlikely to drop. Therefore, it is unnecessary to determine the moving center in the image sensor image stabilization unit 14 based on the light amount drop in the captured image as in FIG. 4B, and the moving center in the image sensor image stabilization unit 14 may be determined by another criterion. The other criterion is to maximize the image stabilization function or to minimize the electric power in the image stabilization unit. FIG. 4D addresses the stroke and sets the moving center in the image sensor image stabilization unit 14 to the position 19b. Thereby, the effective pixel area in the imaging apparatus 6 is entirely located in the area 33. In other words, the captured image has no conspicuous light amount drop. No composition shifts in the electronic preview mode.

Figure 4E:
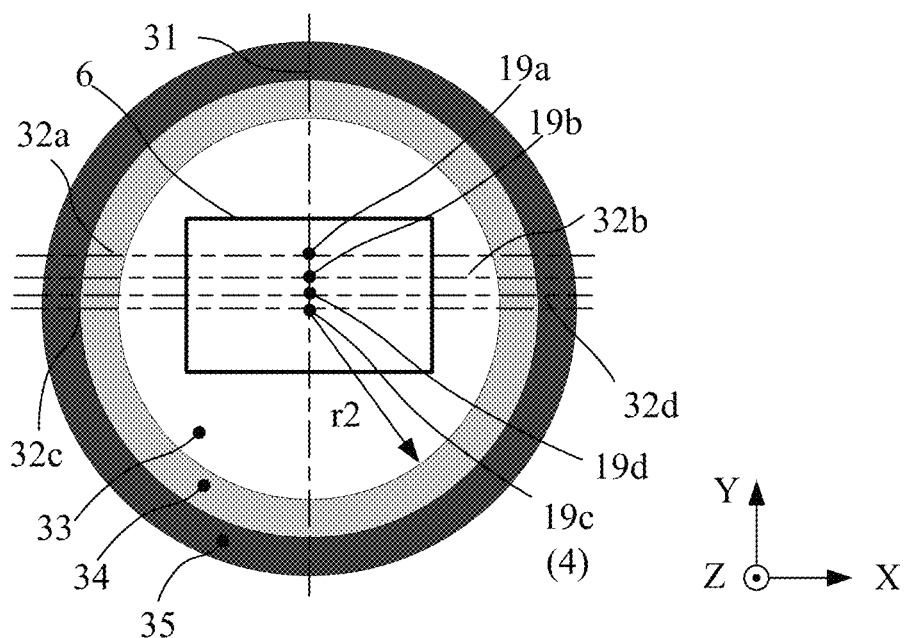

FIG. 4E illustrates a state in which the image circle has a size margin in the electronic preview mode. The moving center in the image sensor image stabilization unit 14 is set to the position 19d on the straight line that connects the position 19b and the position 19c with each other, based on the information on the optical axis position information and the size of the image circle. While the position 19c decenters in the downward direction from the design nominal (located at the position 19b in FIG. 4E), the image circle has a size margin. The image circle has a radius of r2 ($>$r1). FIG. 4D illustrates the maximization of the image stabilization function and the minimization of the electric power as a determinant of the moving center in the image sensor image stabilization unit 14. FIG. 4E further introduces a light amount drop of the captured image as the determinant in addition to the above factors. As described above, the light amount from the imaging optical system 3 actually changes continuously. In other words, when only the light amount is considered, the state of FIG. 4B is most convenient. On the other hand, the state of FIG. 4D is the most convenient, when the image stabilization performance or the like is addressed. FIG. 4E illustrates an intermediate case between them in which the well-balanced position of the light amount and the image stabilization performance is set to the moving center in the image sensor image stabilization unit 14. For example, where the imaging time is not so long, the image stabilization stroke is not necessarily large and it is thus conceivable to shift the moving center in the image sensor image stabilization unit 14 so as to prioritize the light amount. No composition shift occurs in the electronic preview mode.

As described above, the present invention can provide an image in which the peripheral light amount drop of the optical system and blur are suppressed while suppressing the composition shift.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-002782, filed on Jan. 11, 2018, which is hereby incorporated by reference herein in its entirety.

What is claimed is:

1. An imaging apparatus to which a lens apparatus having an imaging optical system is attachable, the imaging apparatus comprising:

an image sensor configured to capture an object image formed through the imaging optical system;

an image stabilization unit configured to move the image sensor on a plane orthogonal to an optical axis in the imaging optical system;

a controller configured to control a movement by the image stabilization unit; and a receiver configured to receive, from the attached lens apparatus, at least one of information on a position of an optical axis in the imaging optical system and information on a size of an image circle of the imaging optical system, wherein the controller controls the movement by the image stabilization unit based on information on the imaging optical system which the receiver acquires from the lens apparatus in an electronic preview mode used to observe an image signal about the object image based on an output from the image sensor.

2. The imaging apparatus according to claim 1, wherein the receiver receives, from the lens apparatus, the information on the position of the optical axis in the imaging optical system, and wherein the controller controls the movement so that a center of the image sensor is located on the optical axis in the imaging optical system when the image stabilization unit is stationary.

3. The imaging apparatus according to claim 1, further comprising a mount configured to enable the lens apparatus to be attached, wherein the controller controls the movement so that a center of the image sensor is located on a center axis in the mount when the image stabilization unit is stationary.

4. The imaging apparatus according to claim 1, wherein the controller controls the movement so that the image sensor is located at a position that minimizes an electric power in the image stabilization unit.

5. The imaging apparatus according to claim 1, further comprising an optical viewfinder unit configured to optically observe the object image, wherein the controller controls the movement so that a center of the image sensor is located on an optical axis in the optical viewfinder unit in the optical preview mode that enables the object image to be optically observed using the optical viewfinder unit when the image stabilization unit is stationary.

6. The imaging apparatus according to claim 1, wherein the receiver receives at least the information on the position of the optical axis of the imaging optical system from the attached lens apparatus.

7. The imaging apparatus according to claim 1, wherein the electronic preview mode, the controller determines a moving center in the image stabilization unit based on the information on the imaging optical system which the receiver acquires from the lens apparatus, and controls the movement based on the determined moving center.

8. The imaging apparatus according to claim 7, further comprising a mount configured to enable the imaging optical system to be attached, wherein the controller controls the movement so that a center of the image sensor is located on a straight line that passes through an intersection of the optical axis in the imaging optical system and the image sensor and an intersection of a center axis in the mount and the image sensor when the image stabilization unit is stationary.

9. The imaging apparatus according to claim 7, wherein the controller determines whether to determine the moving center in the image stabilization unit in the electronic preview mode by using a first method or to determine the moving center in the image stabilization unit in the electronic preview mode by using a second method that is different from the first method, based on at least one of the information on the position of the optical axis of the imaging optical system and the information on the size of the image circle of the imaging optical system received by the receiver.

10. The imaging apparatus according to claim 9, wherein the first method is a method that determines the moving center in the image stabilization unit in the electronic preview mode based on at least one of the information on the position of the optical axis of the imaging optical system and the information on the size of the image circle of the imaging optical system received by the receiver.

11. The imaging apparatus according to claim 10, wherein the second method is a method that determines the moving center in the image stabilization unit in the electronic preview mode based on the information on a movement of the image sensor by the image stabilization unit.

12. The imaging apparatus according to claim 11, wherein the information on the movement of the image sensor by the image stabilization unit is information on electronic power required for the movement of the image sensor by the image stabilization unit.

13. The imaging apparatus according to claim 11, wherein the information on the movement of the image sensor by the image stabilization unit is information on a center of a movable range of the image sensor by the image stabilization unit.

14. The imaging apparatus according to claim 11, wherein the information on the movement of the image sensor by the image stabilization unit is information on a detection resolution of a position detector that detects a position of the image sensor.

15. The imaging apparatus according to claim 11, wherein the information on the movement of the image sensor by the image stabilization unit is information on a friction caused by the movement of the image sensor.

16. The imaging apparatus according to claim 10, wherein the second method is a method that determines the moving center in the image stabilization unit in electronic preview mode based on the information on the position of the optical axis of the imaging optical system and the information on a movement of the image sensor by the image stabilization unit received by the receiver.

17. The imaging apparatus according to claim 9, wherein the receiver receives at least the information on the size of the image circle of the imaging optical system, and wherein the controller determines whether to determine the moving center in the image stabilization unit in the electronic preview mode by using the first method or determine the moving center in the image stabilization unit in the electronic preview mode by using the second method determines, based on the information on the size of the image circle.

18. The imaging apparatus according to claim 7, wherein in the electronic preview mode, the controller controls the movement by the image stabilization unit based on the determined moving center and a shake amount of the imaging apparatus.

19. The imaging apparatus according to claim 7, wherein the moving center in the image stabilization unit is a position when the image stabilization unit is stationary.

20. The imaging apparatus according to claim 7, wherein in the electronic preview mode, the controller controls the movement by the image stabilization unit based on the determined moving center and a shake amount of the imaging apparatus.

21. A camera system comprising:
an imaging optical system included in a lens apparatus;
an image sensor configured to capture an object image formed through the imaging optical system;
an image stabilization unit configured to move the image sensor on a plane orthogonal to an optical axis in the imaging optical system;
a controller configured to control a movement by the image stabilization unit; and
a receiver configured to receive, from the lens apparatus, at least one of information on a position of an optical axis in the camera system and information on a size of an image circle of the imaging optical system,
wherein the controller controls the movement by the image stabilization unit based on information on the imaging optical system which the receiver acquires from the lens apparatus in an electronic preview mode used to observe an image signal about the object image based on an output from the image sensor.

22. The camera system according to claim 21, wherein the imaging optical system includes a storage unit configured to store information on the imaging optical system.

* * * * *